United States Patent [19]

Barnard

[11] 4,429,265

[45] Jan. 31, 1984

[54] MOTOR DRIVEN WINDOW WINDING MECHANISMS

[75] Inventor: Dominic P. E. Barnard, Witney, England

[73] Assignee: Smiths Industries Public Limited Company, London, England

[21] Appl. No.: 216,707

[22] Filed: Dec. 15, 1980

[30] Foreign Application Priority Data

Dec. 14, 1979 [GB] United Kingdom ................ 7943141
Jul. 24, 1980 [GB] United Kingdom ................ 8024347

[51] Int. Cl.[3] ........................................ G05B 5/00

[52] U.S. Cl. .............................. 318/475; 318/265; 318/470

[58] Field of Search .......... 49/349; 318/475, 264-267, 318/466-470; 200/51 R, 61.39, 61.48, 61.45

[56] References Cited

U.S. PATENT DOCUMENTS

| | | | |
|---|---|---|---|
| 2,329,280 | 9/1943 | Lunken et al. | 318/475 |
| 2,407,537 | 9/1946 | Chapman | 318/475 X |
| 2,600,568 | 6/1952 | Nelson | 318/475 X |
| 2,621,926 | 12/1952 | Rossmann et al. | 268/124 |
| 2,763,797 | 9/1956 | Dean | 318/475 X |
| 3,404,485 | 10/1968 | Henderson et al. | 318/267 X |
| 3,662,491 | 5/1972 | Boyriven | 49/349 X |
| 3,742,646 | 7/1973 | Piech | 49/349 X |

FOREIGN PATENT DOCUMENTS 822658 10/1959 United Kingdom .

*Primary Examiner*—Ulysses Weldon
*Attorney, Agent, or Firm*—Pollock, Vande Sande & Priddy

[57] ABSTRACT

A motor driven winding mechanism suitable for a vehicle panel or the like, said window being movable by means of a raising and lowering mechanism (41) having an operating shaft (50) thereon which is rotatable to effect raising and lowering of the window, includes a reduction gear unit (10-30) drivingly coupled to the motor and to be mounted on the operating shaft for rotating that shaft, and sensing means (52-62; 72-80) for sensing rotation of the gear unit about that shaft due to reactive torque produced in the gear unit during operation and controlling operation of the motor in accordance therewith, for example, by de-energizing or reversing the motor upon a predetermined rotation being sensed. The sensing means senses predetermined displacement of the reduction gear unit around the operating shaft axis against the action of a spring (60, 80) resulting from reactive torque produced therein.

32 Claims, 7 Drawing Figures

MOTOR DRIVEN WINDOW WINDING MECHANISMS

This invention relates to motor driven winding mechanisms and, more particularly, to motor driven window winding mechanisms for mounting in a vehicle panel of the kind provided with an operating shaft rotatably mounted thereon and a transmission which applies movement to a window in response to rotation of the operating shaft.

The invention is particularly concerned with motor driven window winding mechanisms of the type described in, for example, U.K. Patent Specification No. 1511861, in which a reversible electric motor is arranged to drive, through a flexible cable, a reduction gear unit that is coupled to and mounted on the operating shaft in the vehicle door whereby operation of the electric motor is effective to rotate the operating shaft and thereby raise, or lower, the vehicle window.

It is one object of the present invention to provide an improved motor driven winding mechanism of the aforementioned type.

As with any powered-window system there is a danger that a person's fingers may inadvertently be trapped between the window and the window frame during raising of the window. In most circumstances, the mechanical resistance inherent in the linkages of the window winding transmission together with the added resistance to the movement of the window attributable to the presence of a person's fingers between the window and the window frame will be sufficient to cause the motor to stall without any injury resulting to the person's fingers.

However, in some circumstances the inherent mechanical resistance of the window winding transmission may be minimal in which case it would be desirable to provide means for reducing the risk of injury in the event that a person's fingers become trapped between the window and the window frame.

It is another object of the present invention to provide a motor driven window winding mechanism which substantially reduces the aforementioned risk.

According to the present invention there is provided a motor driven winding mechanism suitable for mounting in a vehicle door of the kind having an operating shaft mounted thereon rotation of which is effective to move a window, comprising a motor, a reduction gear unit which is adapted to be mounted on the operating shaft and which has an input that is arranged to be driven by the motor and an output that is to be operatively coupled to the operating shaft for rotating the operating shaft, and sensing means for sensing reactive torque produced in the reduction gear unit during operation and controlling operation of the motor in accordance therewith.

The sensing means may be arranged to de-energise or, alternatively, reverse the motor upon a predetermined reactive torque being sensed thereby. Preferably the sensing means is arranged to sense displacement of the reduction gear unit about the axis of the operating shaft relative to the vehicle panel resulting from reactive torque produced in the reduction gear unit during operation.

The sensing means may also include means, for example resilient means, for restraining displacement of the reduction gear unit arround the axis of the operating shaft, and be arranged to sense displacement of the reduction gear unit against the action of the restraining means.

The sensing means may be arranged to sense displacement of the reduction gear unit in either directional sense around the axis of the operating shaft.

Furthermore, the sensing means preferably includes responsive means, for example an electric switch, responsive to a predetermined displacement of the reduction gear unit.

A member may be attached to the reduction gear unit to move with the unit in which case the sensing means may be arranged to sense pivotal displacement of that member around the axis of the operating shaft. In addition, the mechanism may include means for loosely coupling the member to the vehicle panel.

This loose coupling means, which preferably comprises a pin and slot arrangement, may define a stop for limiting pivotal displacement of the member in a first direction towards which the member is biassed by the resilient means. In this case, the sensing means is preferably arranged to respond, for example by means of an electrical switch, to a predetermined displacement of the member in a second direction to control operation of the motor in accordance therewith.

Alternatively, the loose coupling, again for example comprising a pin and slot arrangement, may define a rest position for the member towards which the member is biassed by the resilient means. In this case the sensing means is preferably arranged to respond to a predetermined pivotal displacement of the member in either directional sense away from that rest position.

The reduction gear unit, which may include an input gear drivingly coupled to the motor through, for example a flexible drive shaft, an output gear for rotatably driving the operating shaft and a housing for the gears, is preferably adapted to be mounted on and supported solely by the operating shaft.

Various forms of motor driven window winding mechanisms in accordance with the present invention will now be described, by way of example, with reference to the accompanying drawings in which.

The motor driven window winding mechanisms are for use with an existing conventional manually-operated window winding mechanism of a motor vehicle having an operating shaft and a transmission which applies movement to a motor vehicle window in response to rotation of the operating shaft. The motor driven window winding mechanisms include a reversible electric motor which drives the operating shaft for the window through a reduction gearing unit. This reduction gearing unit is mounted on and supported solely by the operating shaft and comprises a worm gear, a worm to drive the worm gear and a coupling device which couples the worm gear to the operating shaft. The worm gear is connected to one end of a flexible drive cable whose other end is connected to the output shaft of the motor which is disposed in the door at a location remote from the reduction gearing. Operation of the motor is controlled by electric switches which are mounted on, for example, the dashboard of the vehicle or the appropriate vehicle door and which are operable to control the direction and extent of rotation of the motor output shaft and thereby enable the respective vehicle window to be appropriately positioned.

Figure 1:
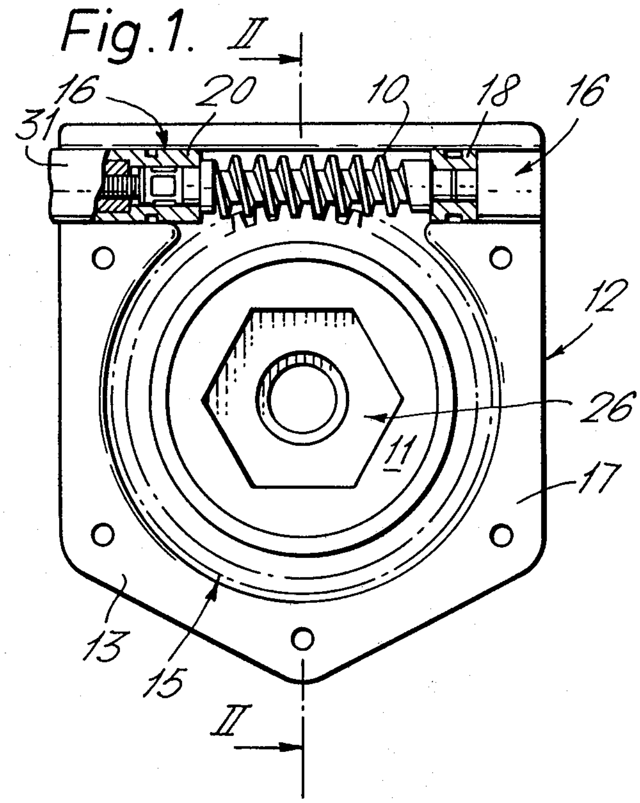
FIG. 1 is a side view of a known reduction gearing of the mechanisms with its casing partially removed.
Figure 2:
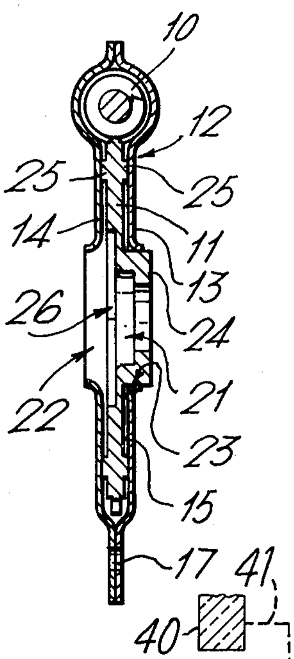
FIG. 2 is a sectional view of the line II—II of FIG. 1.
Figure 3:
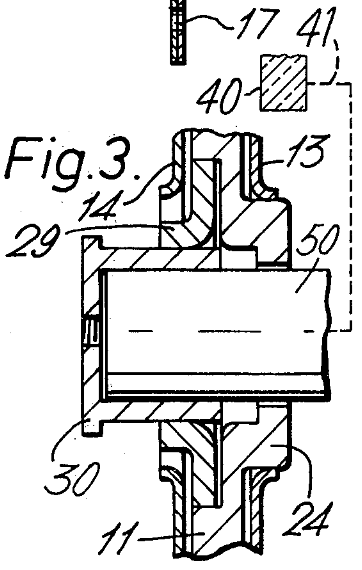
FIG. 3 is a fragmentary sectional view of the known reduction gearing showing means for coupling the reduction gearing to conventional operating shaft for a vehicle window.

Referring to FIGS. 1 to 3, the reduction gearing includes a worm 10 and a worm gear 11 mounted in meshing engagement in a casing 12. This casing 12 is in two parts 13 and 14, each part being pressed from mild steel sheet to provide a circular recess 15 to house the worm gear 11 and two half-cylindrical sockets 16 which are intersected by the recess 15. The resulting flanges 17 around the recesses 15 abut one another and are secured together by, for example, rivets.

The worm 10 is rotatably mounted in the half-cylindrical sockets in meshing engagement with the worm gear 11. The shaft of the worm 10 is of reduced diameter at one end and supported in a moulded nylon bearing 18 clamped between the two parts 13 and 14 of the casing. The other end of the worm shaft is also of reduced diameter and is mounted in a bearing formed in a moulded nylon ferrule 20.

The worm gear 11 is moulded of plastics and is rotatably mounted in a bearing provided by the casing 12. The two parts 13 and 14 have respective circular apertures 21 and 22 therein aligned with the rotational axis of the gear 11, the edge of the part 13 bounding the aperture 21 being turned outwardly to provide a continuous annular bearing surface 23 for the gear 11. An axially-extending projection 24 of annular cross-section and providing a continuous annular surface, is moulded integrally with the gear 11 on the side thereof adjacent the bearing surface 23 and this projection extends through the bearing aperture 21 with the outer circumferential surface of the projection 24 engaging the bearing surface 23. Annular projections 25, centred on the rotational axis of the gear 11, are provided on the sides of the gear to limit the extent of sideways movement of that gear in the casing 12.

An aperture 26 of hexagonal shape is moulded in the other side of the gear 11 and this aperture houses a plate-like part 29 (FIG. 3) of metal having an hexagonal outer edge which engages with the aperture 26 so that the part 29 is driven by the gear 11. The part 29 has a central, square aperture to receive the operating shaft, the inner portion of the part 29 being shaped to define a short sleeve of rectangular cross-section that extends axially of the operating shaft and is spaced therefrom. The part 29 may be secured to the drive gear 11 by screws (not shown). The device for coupling the part 29 to the operating shaft is constituted by a moulded insert 30 of glass-filled nylon having a sleeve portion of square cross-section which fits snugly in the part 29. The insert 30 has a central aperture to receive the operating shaft so that the reduction gearing is supported by the operating shaft and mounted thereon.

When it is required to mount the reduction gearing on the shaft, the operating shaft (50) is inserted through the aperture in the part 29, and the insert 30 is then inserted into the space between the part 29 and the shaft. Rotation of the operating shaft 50, as shown in FIG. 3, serves to raise and lower the vehicle window, referenced at 40, through mechanical transmission 41. The end of the operating shaft on which the reduction gearing is mounted may be of a number of different cross-section shapes, and in these circumstances, a similar number of different inserts 30 are provided, the inserts having central apertures to cooperate with respective ones of the shafts.

If the motor driven window winding equipment fails, the insert 30 is removed to disengage the reduction gearing from the operating shaft and permit emergency manual operations of the operating shaft.

The reduction gearing described is similar to that disclosed in UK Patent Specification No. 1511861.

Figure 4:
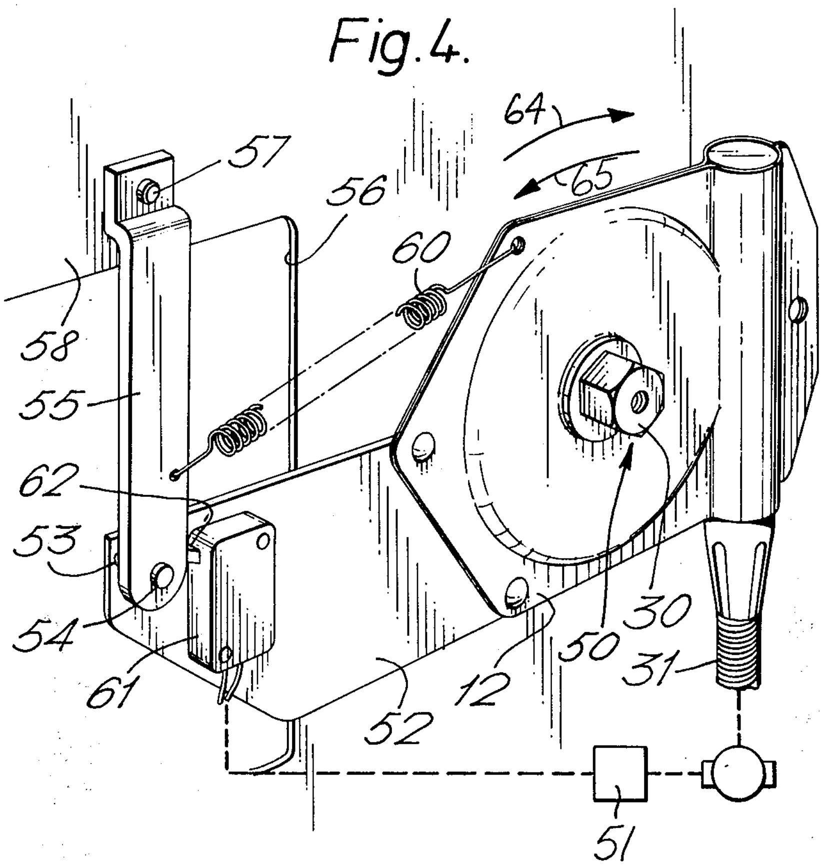
FIG. 4 is a perspective view of a part of a vehicle door showing components of one form of the mechanism installed therein.
Figure 7:
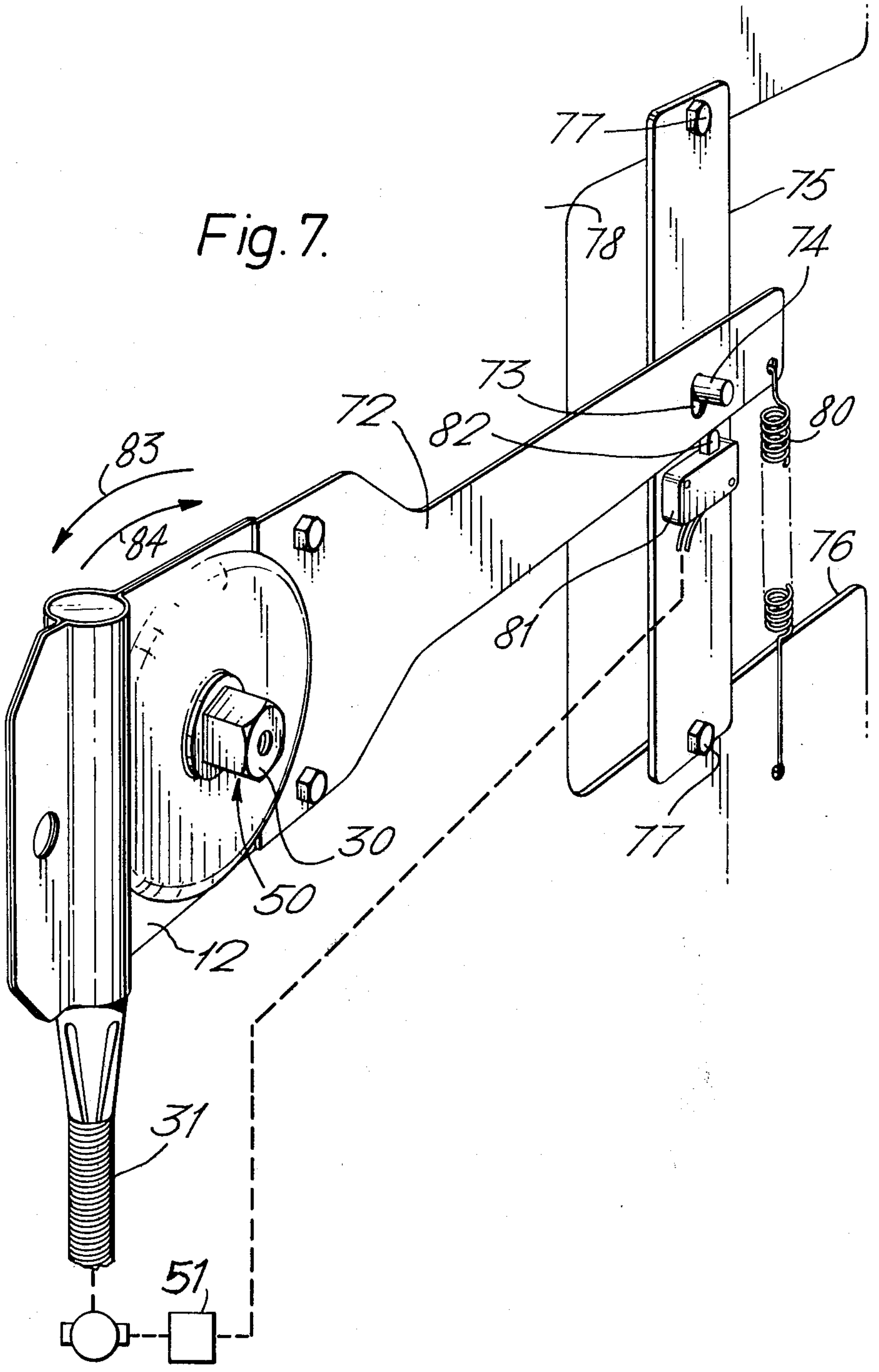
FIG. 7 is a perspective view of a part of a vehicle door showing components of another form of the mechanism installed therein.

Referring now to the embodiments of the mechanism of FIGS. 4 and 7, the reduction gearing in each case is shown mounted on, and supported by the operating shaft, 50, covered by the insert 30, in a vehicle door panel. The output from the reversible electric motor (shown schematically) is connected to the reduction gearing through the flexible drive shaft 31 which comprises a plastics covered outer sleeve and an inner drive member of helically-wound metal strip. The reversible electric motor, which is mounted on the door structure remote from the operating shaft, is a conventional d.c. electric motor with its associated control switch unit as schematically represented at 51 being electrically connected between the ignition switch of the vehicle and the motor windings and being selectable to control the direction of current flow through the windings and hence the direction of rotation of the motor and the direction of movement of the respective window.

Referring in particular to the embodiment shown in FIG. 4, a torque arm 52 is mounted on the casing 12 of the reduction gearing and cooperates with a fixed part of the door panel through an intermediate member 55 to prevent substantial rotation of the reduction gearing around the axis of the operating shaft 50 upon operation of the electric motor. The torque arm comprises an elongate metal plate which is screwed at is one end onto the casing 12 of the reduction gearing so as to be immovable with respect thereto, and which has, as shown more clearly in FIG. 5, a straight slot 53 therein adjacent its other end through which projects a pin 54 carried by the member 55. The member 55 extends across an aperture 56 in the door panel 58 and is mounted on the door panel 58 by means of a bolt 57 through its end remote from the torque arm 52 whereby it is capable of pivotal movement around the bolts 57. The pin 54 is mounted on the member 55 such that it extends along a line substantially parallel to the axis of the operating shaft and at right angles to the plane of the torque arm 52. The longitudinal dimension of the slots 53, which as shown in FIG. 5 slopes downwardly generally towards the operating shaft 50, is greater than the diameter of the pin 54, and the slot 53 and pin 54 are arranged with respect to one another such that the torque arm 52, together with the reduction gearing, is allowed to pivot through a small angle around the axis of the operating shaft, but engagement between the pin 54 and the ends of the slot 53 prevents any substantial rotation thereof.

It is desirable that the reduction gear unit be mounted on the operating shaft in a plane substantially at right angles to the axis of the operating shaft, with the axis of the bore of the insert 30 being aligned with that of the operating shaft, and that any loading on the reduction gearing tending to pull it away from this desired configuration, (as could occur if, for example, a short metal strap were simply screwed between one edge of the casing 12 and the door panel to prevent rotation of the reduction gearing about the axis of the operating shaft and if that strap were not suitably shaped to take into account the displacement of the plane of the reduction gearing from that of the door panel), is eliminated or at least reduced. The provision of a pin and slot arrangement in the aforementioned manner ensures that no such undesirable loading is applied to the reduction gearing whilst at the same time prevents the reduction gearing from rotating substantially about the axis of the operating shaft during operation of the mechanism. This arrangement facilitates installation of the mechanism in a vehicle door since the reduction gearing is allowed to find its own position with respect to the operating shaft when mounted thereon irrespective of whether or not the operating shaft is orthogonal with the door panel.

Figure 5:
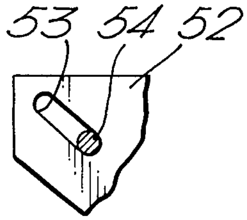
FIGS. 5 and 6 are enlarged sectional views of a part of the mechanism of FIG. 4 showing alternative arrangements.

A helical spring 60 is connected between the member 55, at a point intermediate the pin 54 and the bolt 57, and the casing 12 of the reduction gearing, and is arranged to urge the member 55 anticlockwise in FIG. 4 such that, under normal circumstances, the torque arm 52 is biassed clockwise around the operating shaft 50 through cooperation of the pin 54 with the sloping slot 53 whereby the pin 54 bears against the lower end of the slot 53, as shown in FIG. 5.

A micro-switch 61 is mounted on the torque arm 52 adjacent the member 55 with one edge of the member 55 bearing against the operating element 62 of the microswitch 61. The microswitch 61 is arranged with respect to the member 55 such that when the torque arm 52 is in the position shown in FIG. 4, that is, with the pin 54 in engagement with the lower end of the slot 53, the micro-switch is in its closed state, and when the torque arm 52 pivots anti-clockwise around the axis of the operating shaft through a predetermined displacement against the action of the helical spring 60, the aforementioned edge of the member 55 is moved away from the operating element of the micro-switch so as to switch it to its open state. The micro-switch 61 is wired into the electrical circuit which supplies current to the reversible motor to raise the window, and is operable to open and close that circuit when in its open and closed states respectively.

Operation of the motor driven window winding mechanism shown in FIG. 4 to effect movement of the window downwardly will now be described with particular reference to that figure. Upon energisation of the electric motor in the appropriate direction by manual actuation of its associated control switches, drive is transmitted through the flexible cable 31 to the reduction gearing. Within the reduction gearing, the worm 10 rotates the worm gear 11 and the insert 30 which in turn rotates the operating shaft to lower the window through the window winding transmission. During operation of the reduction gearing in this manner, a reaction torque is produced in the reduction gearing, as a result of the inherent mechanical resistance in the winding transmission, which tends to rotate the reduction gearing, and with it the torque arm 52, about the rotational axis of the operating shaft in a clockwise direction as indicated by the arrow 64 in FIG. 4, but is prevented from doing so by engagement between the pin 54 and the lower end of the slot 53 in the torque arm 52. In this way, full power is applied to the window winding transmission which is particularly advantageous in situations where, for example ice is present on the window and it is necessary to dislodge the ice in order to lower the window.

The pin and slot arrangement serves to allow some backlash in the window winding mechanism.

When the window has reached its lowermost position, the electric motor is de-energised by a limit switch (not shown) connected in the electrical circuit supplying current to the motor, the limit switch being arranged to be mechanically actuated by the window to open that circuit upon the window attaining its lowermost position.

To raise the window, the electric motor is energised in the reverse direction so that the worm 10, worm gear 11, insert 30 and the operating shaft are driven in the opposite sense to that for lowering the window.

In this case, reactive torque produced in the reduction gearing as a result of the mechanical resistance inherent in the transmission is this time in the opposite sense and tends to rotate the reduction gearing in an anti-clockwise direction as indicated by the arrow 65 in FIG. 4 around the rotational axis of the operating shaft 50. Although a limited pivotal movement of the reduction gearing is permitted by the pin and slot arrangement, under normal operating conditions the reduction gearing is constrained against rotation by the helical spring 60 acting upon the member 55 to maintain the pin 54 against the lower end of the slot 53. To this end, the spring's tension is adjusted beforehand to balance, or more particular, to over-balance slightly the normal resultant reactive torque set up in the reduction gearing and thereby to maintain the pin 54 against the lower end of the slot 53.

To facilitate adjustment of the tension of the spring 60 to suit particular installational requirements, the end of the spring 60 remote from the casing 12 may be attached to a suitably chosen point on the member 55 intermediate the pin 54 and the bolt 57.

If during the window raising operation any additional loading should be applied to the window winding transmission, which would arise if, for example, an object as a hand bears on the window, the mechanical resistance of the window winding transmission is increased with a corresponding increase in the resultant reactive torque set up in the reduction gearing. When such an abnormally high reactive torque reaches a predetermined value, which is determined to a certain extent by the distance of the pin and slot arrangement along the arm 52 and the position of the spring 60, the tension in the spring 60 is overcome and the torque arm 52 pivots anti-clockwise in FIG. 4 as indicated by the arrow 65. In so doing, cooperation between the pin 54 and the sloping slot 53 pivots the member 55 away from the operating element 62 of the micro switch 61 and, upon a predetermined pivotal displacement of the torque arm 52 being attained, the micro-switch 61 is operated to change to its open state whereupon the supply of the electrical power to the motor is interrupted through operation of the control switch unit 51. Thus the microswitch 61 senses the abnormally high reactive torque in the reduction gearing and responds to a predetermined value thereof to de-energise the electric motor.

During anti-clockwise pivotal displacement of the torque arm 52 in this manner as a result of abnormally high reactive torque being produced in the reduction gearing, the effects of the spring 60 on the member 55 and the slope of the slot 53 are to ensure that the pin 54 is maintained in physical engagement with the side of the slot 53 during movement of the pin 54 with respect to the slot 53. The resulting frictional forces created by this physical engagement introduce mechanical hysteresis into the mechanism which helps to eliminate the tendency of the mechanism to hunt by damping pivotal movement of the arm 52.

Anti-clockwise pivotal movement of the torque arm 52 is limited by engagement of the upper end of the slot 53 with the pin 54.

In the event that the motor is de-energised in this manner, it may be necessary to reverse the direction of the motor momentarily to reset the micro-switch 61. To this end, means such as a diode may be included in the power-supply circuit to the motor within the control switch unit 51 so as to enable the motor to be reversed to reset the micro-switch 61. In some cases however, the torque arm 52 may return to its initial position under the action of the spring 60, and the micro-switch 61 reset accordingly, upon momentary removal of the excessive torque by de-energisation of the motor as described so that reversal is unnecessary.

Of course, in addition to sensing and responding to an abnormally high reactive torque produced in the reduction gearing as a result of an object bearing against the window, the arrangement also serves, firstly, to act as a limit switch to de-energise the electric motor once the window has reached its uppermost position by sensing and responding to the increase in reactive torque produced as a result of the increase in load on the window winding transmission caused by abutment of the window against the window frame, and, secondly, by sensing and responding to a predetermined increase in reactive torque set up in the reduction gearing caused by any abnormalities in the window winding transmission itself.

It will be appreciated that the elongate torque arm 52 serves to magnify any rotational displacement of the reduction gearing about the axis of the operating shaft, and that by appropriately varying the length of the torque arm 52, the position of the slot 53 and the pin 54 along the member 55, the length of the slot 53, the positions of the micro-switch 61 along the arm 52 and the spring 60 along the member 55, and the tension of the spring 60, the mechanism may be adapted to suit different installations and accommodate their respective requirements.

Figure 6:
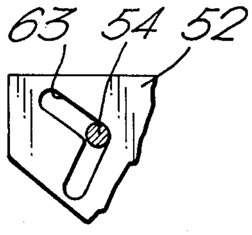

In an alternative form of the embodiment shown in FIG. 4, the arrangement may be adapted to sense abnormally high reactive torque produced in the reduction gearing during both lowering and raising operations of the window by using a modified shape of slot in the torque arm 52 as shown in FIG. 6. With reference to FIG. 6, the modified slot, 63, is generally V-shaped having an upper portion corresponding substantially as regards both its slope and length with the slot 53 shown in FIG. 5 and a lower portion which slopes in the opposite direction such that the slot 63 points towards the operating shaft with the apex of the V disposed closer to the reduction gearing than the upper and lower ends of the slot 63. In normal circumstances, the spring 60 acts on the member 55 such that the pin 54 is urged towards and rests in the apex of the V-shape slot, as is shown in FIG. 6.

If during operation of the mechanism to raise the window an abnormally high reactive torque is produced in the reduction gearing, the pin 54 slides along the upper portion of the slot 63 in an identical manner with that of the arrangement described with reference to FIGS. 4 and 5 such that the member 55 is moved away from the operating element 62 of the micro-switch 61 thereby actuating the switch 61 to de-energise the electric motor.

If, on the other hand, an abnormally high reactive torque is produced during a window lowering operation, the torque arm 52 will tend to move clockwise in FIG. 4 as indicated by arrow 64, since the reduction gearing is being driven in the reverse sense. Should the reactive torque be sufficient to overcome the tension in the spring 60, the pin 54 moves with respect to the slot 63 along the lower portion of the slot 63 whereby the member 55 is again pivotally displaced relative to the micro-switch 61 to operate the switch and de-energise the electric motor. Pivotal displacement of the torque arm 52 is limited by engagement of the pin 54 with the lower end of the slot 63. As with the slot 53, frictional forces between the pin 54 and the lower portion of the slot 63 serve to prevent hunting in the mechanism by damping movement of the arm 52.

Following de-energisation of the motor in either sense of operation of the mechanism, the torque arm 52 may be returned to its initial position under the action of the spring 60 so that the micro-switch is reset accordingly. In some circumstances, it may be desirable to include means in the control switch unit 51 to enable the motor to be reversed in order that the micro-switch 61 be reset. This means may comprise a resistance connected across the micro-switch which allows just sufficient motor current for it to reverse and thereby effect resetting of the micro-switch 61.

Instead of arranging that actuation of the micro-switch as a result of an abnormally high reactive torque set up in the reduction gear unit serves to de-energise the motor as described, the micro-switch 61 may be arranged in the power supply circuit to the motor such that the actuation thereof in the aforementioned manner serves to operate the control switch unit 51 to cause energization of the motor in the reverse sense.

A modified form of the motor driven window winding mechanism of FIG. 4 will now be described with reference to FIG. 7. It will be appreciated that the mechanism is generally similar to the previously described embodiment and that the foregoing description is applicable to this mechanism so far as the same components or similar counterparts are concerned. The following description will concern itself primarily therefore with the components of the mechanism which differ from those described previously.

Referring to FIG. 7, a torque arm 72 comprising an elongate metal plate is mounted at its one end on the casing 12 of the reduction gearing and cooperates with a fixed part on the door panel to prevent substantial rotation of the reduction gearing around the axis of the operating shaft upon operation of the electric motor. The torque arm 72 has a vertical slot 73 adjacent its other end through which projects a pin 74 carried by a bracket 75 that is secured across an aperture 76 in the door panel 78 by means of screws 77. The pin 74 extends substantially parallel to the axis of the operating shaft and ar right angles to the plane of the torque arm 72. The slot 73 and the pin 74 are arranged such that the torque arm 72, together with the reduction gearing, is capable of pivoting through a small angle around the axis of the operating shaft 50, which is limited be engagement between the pin 74 and the ends of the slot 73.

As with the embodiment of FIG. 4, this pin and slot arrangement facilitates installation of the mechanism in a vehicle door since the reduction gearing is allowed to find its own position with respect to the operating shaft 50 when mounted thereon.

A helical spring 80 connected between the end of the torque arm 72 and the door structure is arranged to bias the arm 72 downwardly in FIG. 7 such that the upper end of the slot 73 bears against the pin 74.

A micro-switch 81 is mounted on the bracket 75 beneath the torque arm 72 with the torque arm 72 bearing against the operating element 82 of the micro-switch 81. The micro-switch 81 is arranged with respect to the torque arm 72 such that when the torque arm 72 is in the position shown in FIG. 7, that is, with the pin 74 in engagement with the upper end of the slot 73, the micro-switch is in its closed state, and when the torque arm 72 pivots anti-clockwise around the axis of the operating shaft, as indicated by the arrow 84 a predetermined displacement of the torque arm 72 operates the micro-switch to switch it to its open state. The micro-switch 81 is wired into the control switch unit 51 which supplies current to the reversible motor to raise the window, and is operable to open and close that circuit when in its open and closed states respectively.

Upon energisation of the electric motor in the appropriate direction and the subsequent rotation of the operating shaft through the flexible cable 31, the gears 10 and 11 and the insert 30 to lower the window as described previously, a reactive torque is produced in the reduction gearing as a result of the inherent mechnical resistance in the window winding transmission. This reactive torque tends to rotate the reduction gearing, and with it the torque arm 72, about the axis of the operating shaft in a clockwise direction in FIG. 7, as indicated by the arrow 84, but is prevented from doing so by engagement between the pin 74 and the upper end of the slot 73 in the torque arm 72 so that full power is applied to the window winding transmission.

The pin and slot arrangement serves to allow some backlash in the window winding mechanism.

As before, the electric motor is de-energised by a limit switch upon the window attaining its lowermost position.

To raise the window, the electric motor is energised in the reverse direction so that the worm 10, worm gear 11, insert 30 and the operating shaft are driven in the opposite sense. The reactive torque produced in the reduction gearing is this time in the opposite sense and tends to rotate the reduction gearing in an anti-clockwise direction in FIG. 7 around the axis of the operating shaft. Although a limited pivotal movement of the reduction gearing is permitted by the pin and slot arrangement, under normal operating conditions the reduction gearing is constrained against rotation by the helical spring 80, whose tension is suitably adjusted beforehand, acting upon the torque arm 72 to maintain the upper end of the slot 73 against the pin 74.

If during the window raising operation any additional loading should be applied to the window winding transmission, for example, as the result of an object such as a hand bearing on the window, the mechanical resistance of the window winding transmission is increased with a corresponding increase in the resultant reactive torque set up in the reduction gearing and the tendency for the arm 72 to rotate. When such an abnormally high reactive torque reaches a predetermined value, determined to a certain extent by the location of the pin and slot arrangement and the spring along the arm 72 and the spring tension, the tension in the spring is overcome and the torque arm pivots anti-clockwise as indicated by the arrow 85 in FIG. 7. In so doing, the torque arm 72 moves away from the operating element 82 of the micro-switch 81 and, upon a predetermined pivotal displacement of the torque arm 72 being attained, the micro-switch 81 is actuated to change to its open state, thereby interrupting supply of electrical power to the motor through the control switch unit 51.

Thus the micro-switch 81 senses the abnormally high reactive torque in the reduction gearing and responds to de-energise the electric motor.

In the event that the motor is de-energised in this manner, it may be necessary, as described earlier, to reverse the direction of the motor momentarily to reset the micro-switch 81.

As with the previously described embodiment, the arrangement can also serve both to act as a limit switch to de-energise the electric motor once the window has reached its uppermost position, and to de-energise the motor in response to increase in reactive torque set up in the reduction gearing caused by any abnormalities in the window winding transmission itself.

In an alternative arrangement, the micro-switch 81 may be connected to the control switch unit 51 in the motor power supply circuit such that actuation thereof in the aforementioned manner causes the motor to operate in the reverse sense.

It will be appreciated that the torque arm 72 serves to magnify any rotational displacement of the reduction gearing about the axis of the operating shaft, and that by appropriately varying the length of the torque arm 72, the positions of the slot 73, micro-switch 81 and the spring 80 along the arm 72, and the tension of the spring 80, the mechanism may be adapted to suit different installations and accommodates their respective requirements.

I claim:

1. A motor driven winding mechanism for driving a raising and lowering mechanism of a structural element such as a window or the like, said raising and lowering mechanism being mounted in a vehicle panel or the like and having an operating shaft mounted on said panel, rotation of said shaft being effective to move said structural element, said winding mechanism comprising:

a motor;

a reduction gear unit adapted to be mounted on and supported by said operating shaft, said gear unit comprising a casing, an input gear supported by said casing and arranged to be driven by said motor and an output gear supported by said casing and arranged to be operatively coupled to said operating shaft for rotating said operating shaft; and means for sensing the reactive torque produced in said reduction gear unit as a function of rotation of said casing and said input gear about said operating shaft as said winding mechanism encounters resistance to movement of said structural element in at least one direction and for preventing further movement of said structural element in said at least one direction when said reactive torque in said reduction gear unit exceeds a predetermined value.

2. A motor driven winding mechanism according to claim 1, including restraining means for restraining displacement of said casing about said operating shaft, and wherein said sensing and preventing means is arranged to sense reactive torque as a function of displacement of said casing against the action of said restraining means.

3. A motor driven winding mechanism according to claim 2, wherein said restraining means comprises resilient means.

4. A motor driven winding mechanism according to claim 1, wherein said motor is drivingly coupled to said input gear of said reduction gear unit through a flexible drive shaft.

5. A motor driven winding mechanism according to claim 1, 2, 3 or 4, wherein said sensing and preventing means is arranged to sense reactive torque as a function of displacement of said casing in either directional sense about said operating shaft.

6. A motor driven winding mechanism according to claims 1, 2, 3 or 4, wherein said sensing and preventing means includes means responsive to a predetermined reactive torque as a function of displacement of said casing about said operating shaft.

7. A motor driven winding mechanism according to claim 6, wherein said responsive means comprises electrical switch means.

8. A motor driven winding mechanism according to claim 6, wherein said motor is reversible and wherein said sensing and preventing means is arranged to de-energize said motor upon a predetermined displacement of said casing being sensed thereby.

9. A motor driven winding mechansim according to claim 6, wherein said motor is reversible and wherein said sensing and preventing means is arranged to reverse operation of said motor upon a predetermined displacement of said casing being sensed thereby.

10. A motor driven winding mechanism according to claim 3, including a member attached to said casing so as to move therewith, wherein said sensing and preventing means is arranged to sense reactive torque as a function of pivotal displacement of said member about said operating shaft.

11. A motor driven winding mechanism according to claim 10, wherein said member comprises an elongate member which is attached to said casing such that, when said reduction gear is mounted on said operating shaft, said member extends radially therefrom.

12. A motor driven winding mechanism according to claim 10, including means for loosely coupling the said member to said vehicle panel.

13. A motor driven winding mechanism according to claim 12, wherein said means for loosely coupling the said member includes means defining a stop for limiting pivotal displacement of the said member in a first direction, towards which said member is biased by said resilient means.

14. A motor driven winding mechanism according to claim 13, wherein said sensing and preventing means includes means responsive to predetermined pivotal displacement of the said member about said operating shaft in a second direction away from the said stop, to control operation of the motor in accordance therewith.

15. A motor driven winding mechanism according to claim 14, wherein said responsive means comprises electrical switch means.

16. A motor driven winding mechanism according to claim 15, wherein said electrical switch means is arranged to be actuated by said member.

17. A motor driven winding mechanism according to claim 16, wherein said electrical switch means is arranged to de-energize said motor upon actuation thereof by said member.

18. A motor driven winding mechanism according to claim 16, wherein said motor is reversible and wherein said electrical switch means is arranged to reverse operation of said motor upon actuation thereof by said member.

19. A motor driven winding mechanism according to claim 14, wherein said means for loosely coupling said member includes means defining a second stop for limiting pivotal displacement of said member in said second direction.

20. A motor driven winding mechanism according to claim 19, wherein said means for loosely coupling said member comprises a pin and slot arrangement which defines said first and second stops for pivotal displacement of said member.

21. A motor driven winding mechanism according to claim 20, wherein said pin and slot arrangement includes a part which is adapted to be attached to the vehicle panel and is connected to the said member by means of a pin and slot.

22. A motor driven winding mechanism according to claim 21, wherein the pin of said pin and slot arrangement is arranged to bear against the side of the slot thereby to dampen pivotal displacement of said member.

23. A motor driven winding mechanism according to claim 12, wherein said means for loosely coupling the said member defines a rest position for said member towards which said member is biased by said resilient means.

24. A motor driven winding mechanism according to claim 23, wherein said sensing and preventing means includes means responsive to a predetermined pivotal displacement of said member in either directional sense away from the rest position about said operating shaft to control operation of the motor in accordance therewith.

25. A motor driven winding mechanism according to claim 24, wherein said responsive means comprises electrical switch means.

26. A motor driven winding mechanism according to claim 25, wherein said electrical switch means is arranged to respond to said predetermined pivotal displacement of said member so as to de-energize said motor.

27. A motor driven winding mechanism according to claim 25, wherein said motor is reversible and wherein said electrical switch means is arranged to respond to said predetermined pivotal displacement of said member so as to reverse operation of said motor.

28. A motor driven winding mechanism according to claim 23, wherein said means for loosely coupling said member comprises a pin and slot arrangement for coupling said member to said vehicle panel.

29. A motor driven winding mechanism according to claim 28, wherein said pin and slot arrangement includes a part adapted to be attached to said vehicle panel and which is connected to said member by means of a pin and slot.

30. A motor driven winding mechanism according to claim 29, wherein said slot of said pin and slot arrangement defines first and second stops for pivotal displacement of said member on respective sides of said rest position of said member.

31. A motor driven winding mechanism according to claim 30, wherein the pin of said pin and slot arrangement is arranged to bear against the side of the slot to dampen pivotal displacement of said member.

32. A motor driven winding mechanism according to claim 30, wherein the slot of said pin and slot arrangement is generally "V"-shaped, and wherein the said resilient means is arranged to urge the pin of said pin and slot arrangement relative to the slot so as to locate the pin in the apex of the "V"-shaped slot, which apex defines the said rest position for said member.

* * * * *